United States Patent [19]

Rinke et al.

[11] Patent Number: 4,853,937
[45] Date of Patent: Aug. 1, 1989

[54] LASER-ACTIVE AQUEOUS DISPERSION OF A LASER DYE

[75] Inventors: Monika Rinke, Weingarten; Hans Guesten, Spever, both of Fed. Rep. of Germany

[73] Assignee: Kernforschungszentrum Karlsruhe GmbH, Fed. Rep. of Germany

[21] Appl. No.: 271,455

[22] Filed: Nov. 15, 1988

[30] Foreign Application Priority Data

Nov. 17, 1987 [DE] Fed. Rep. of Germany ....... 3738933

[51] Int. Cl.$^4$ ................................................. H01S 3/20
[52] U.S. Cl. ....................................................... 372/53
[58] Field of Search .......................... 372/53, 10, 11, 51

[56] References Cited

U.S. PATENT DOCUMENTS

| 2,701,245 | 2/1955 | Lynn . | |
|---|---|---|---|
| 4,384,973 | 5/1983 | Harnisch | 372/53 |
| 4,475,201 | 10/1984 | Chiu | 372/53 |

FOREIGN PATENT DOCUMENTS

| 1164990 | 4/1984 | Canada | 372/11 |
|---|---|---|---|
| 0177983 | 10/1984 | Japan | 372/53 |

OTHER PUBLICATIONS

K. L. Matthew et al, Appl. Phys. Lett., vol. 33 (9) (1978), pp. 803 to 804.
D. C. Blackley, Emulsion Polymerization, Applied Science, Publ. Ltd., London (1974).
H. Logemann et al, *Methods of Organic Chemistry*, Houben-Weyl, vol. 14/1, Molecular Substances, Part 1, pp. 133+, Thieme-Verlag (1961).
H. Hopff et al, *Macromol Chemistry*, vol. 78, pp. 24 to 36 (1964).
H. Hopff and E. Lutz, *Kunststoffe-Plastics*, vol. 5 (1958), pp. 341 to 344.
W. S. Zimmt, *J. Appl. Sci.*, volume 1 (1959), pp. 323 to 328.

Primary Examiner—William L. Sikes
Assistant Examiner—Georgia Y. Epps
Attorney, Agent, or Firm—Sughrue, Mion, Zinn, Macpeak & Seas

[57] ABSTRACT

A laser-active aqueous dispersion of a laser dye comprising microparticles containing a laser dye, with the microparticles being suspended in an aqueous liquid. The aqueous liquid has an index of refraction which is substantially equal to that of the microparticles.

19 Claims, 1 Drawing Sheet

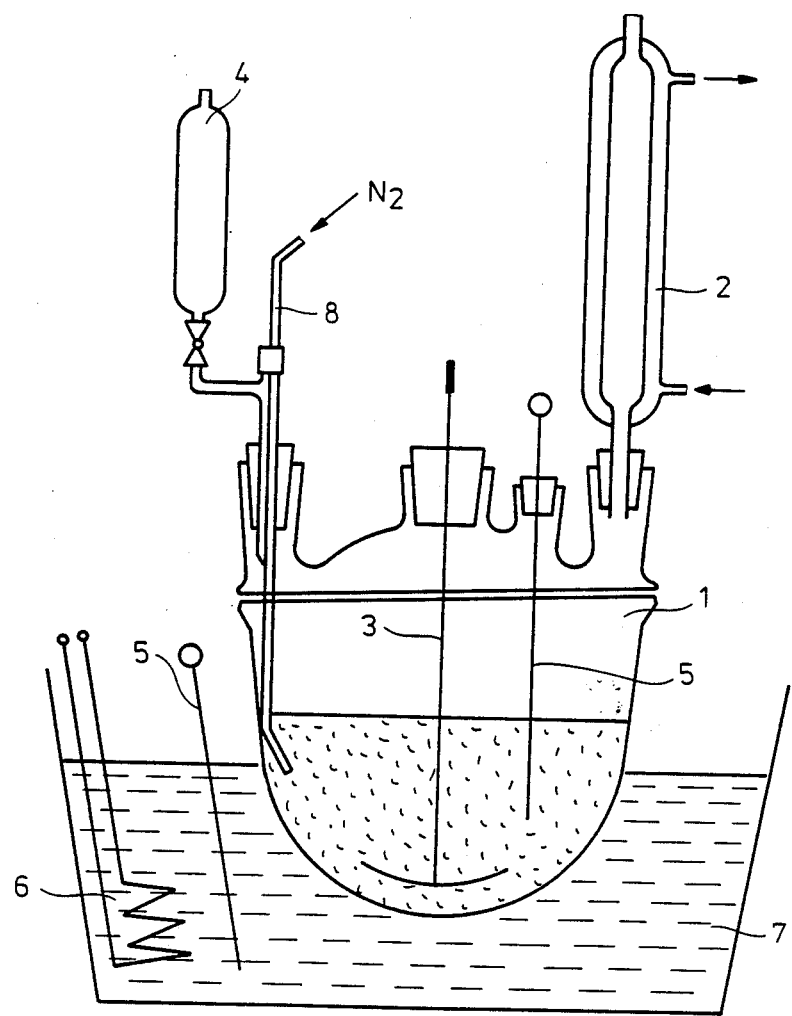

LASER-ACTIVE AQUEOUS DISPERSION OF A LASER DYE

FIELD OF THE INVENTION

The present invention relates to a laser-active aqueous dispersion of a laser dye which can be excited to laser emission by means of a pumping laser.

BACKGROUND OF THE INVENTION

The discovery that many organic compounds in organic solvents are capable of stimulated emission by means of optical excitation from a pumping laser has led, in the past ten years, to widespread use of dye lasers as a tunable monochromatic light source. The major advantage of dye lasers, as compared to gas or solid lasers, is that narrow band and continuously tunable emission wavelengths can be selected, by use of a dispersive element for various applications out of the large fluorescent spectral range of organic dyes.

Dye lasers typically contain a solution of an organic laser dye dissolved in an organic solvent such as an alcohol, dioxane or N,N-diethylformamide. The laser dye solution is pumped in a closed circuit through a dye flow cell (flow through laser dye cell, where it is optically excited to laser emission by means of a pumping laser. The laser dye solution is usually cooled to dissipate heat generated by the pumping laser during optical excitation.

Today about 100 laser dyes are used to cover the spectral range from 350 to 1200 nm.

The use of laser dyes in organic solvents as laser-active mediums in conventional manner has severe drawbacks.

The optical excitation by means of the pumping laser liberates heat in the solvent. The refractive index of an organic solvent depends strongly on its temperature (about $-4 \times 10^{-3} [K^{-1}]$), and as a result the liberated heat causes striation ("Schlieren") and flow fluctuations in the laser-active dye medium. The heat induced fluctuations and striations in the laser-active dye medium in turn degrade and lower the laser beam quality of the dye laser.

Other drawbacks of the organic solvent include flammability, risk of explosion, and toxicity. Water would be an ideal solvent for dye lasers because it is safe to handle, has a high heat capacity and a very low temperature dependence of its refractive index ($-0.09 \times 10^{-3} [K^{-1}]$).

However, few laser dyes are adequately soluble in water. Such laser dyes have a penchant toward dimerization, resulting in an adverse effect on dye laser emission. Dimerization is a function of laser dye concentration. Dimerization begins to occur at laser dye concentrations of $10^{-4}$ mol/l, which is within the laser dye concentration range used in dye lasers.

To date, poor solubility of most laser dyes in water has ruled out the possibility of the use of water as a solvent in dye lasers.

A laser-active aqueous medium is described by K. L. Matheson, J. M. Thorne, *Appl. Phys. Lett.* Volume 33, (9) (1978), pages 803 to 804, in which the laser dye is dissolved in organic solvents and this solution is subsequently emulsified in water. This process requires that the organic solvent exhibit the same refractive index as water. However, due to the inherent time-related instability of aqueous emulsions of organic solvents, the dimerization of high dye concentrations and the constraints on dye/solvent composition with respect to its emulsibility in water, this laser-active aqueous medium is only usable for special applications.

SUMMARY OF THE INVENTION

An object of the present invention is to provide a means for using laser dyes in dye lasers without employing as solvent for the laser dye the previously used organic solvents of the prior art. Another object of the present invention is to provide a means for using arbitrarily selected laser dyes in dye lasers.

A further object of the present invention is to provide a laser-active aqueous suspension with superior characteristics, using water insoluble or slightly water soluble laser dyes, to replace organic solvent based laser active media.

Additional objects and advantages of the present invention will be set forth in part in the description which follows and in part will be obvious from the description or can be learned by practice of the invention. The objects and advantages are achieved by means of the compositions, processes, instrumentalities and combinations particularly pointed out in the appended claims.

To achieve the foregoing objects and in accordance with its purpose, the present invention provides a laser-active aqueous dispersion of a laser dye which can be excited to laser emission by a pumping laser, comprising microparticles containing a laser dye, an aqueous medium having an index of refraction substantially the same as that of the microparticles, and the microparticles are suspended in the aqueous medium.

The microparticles preferably comprise a transparent polymerized organic or inorganic compound. For example, the microparticles preferably can comprise a polymethacrylate, a polyacrylate, a polysilane, a polycarbonate or a polystyrene. It is also preferred for the microparticles to comprise a polyacrylate or polymethacrylate fluorinated in the $\alpha$-position, in the ester group or in both the $\alpha$-position and the ester group.

The aqueous medium can be pure water, or can comprise an immersion agent dissolved in water. The immersion agent should not substantially absorb any light in the wavelength range of a pumping laser used to excite the laser dye or in the wavelength range of the laser beam emitted by the laser dye. The concentration of the immersion agent is adjusted so that the aqueous medium has substantially the same index of refraction as the microparticles. The immersion agent can be an inorganic salt, such as ammonium chloride or ammonium sulfate, or at least one salt selected from the sulfate or chloride salts of the alkali or alkaline earth elements. The immersion agent can comprise a water-soluble organic substance, such as mono-ethylene glycol, glycerin, glucose or a mixture thereof.

The present invention also provides a method for producing laser light, which comprises exciting a laser-active aqueous dispersion of a laser dye by means of a pumping laser, wherein the dispersion comprises a laser dye embedded in microparticles and wherein the microparticles are suspended in an aqueous medium having a refractive index substantially the same as that of the microparticles.

It is to be understood that both the foregoing general description and the following detailed description are exemplary and explanatory, but are not restrictive of the invention.

DESCRIPTION OF THE DRAWING

The sole FIGURE of the drawings is a diagrammatic view of an apparatus which can be used to produce the laser dye embedded microparticles employed in the present invention.

DETAILED DESCRIPTION OF THE INVENTION

The material from which the microparticles are made must have the following properties. The material must have an optical transparency of more than 90% to the exciting wavelength of the pumping laser employed (e.g., excimer, nitrogen, Nd-YAG-, ion laser) as well as to the dye laser used. Also, the material must have a glass point higher than $Tg > 70°$ C., and a refractive index below 7.49. Finally, the material must be one which has an adequate solubility for the laser dyes in its starting components which are used to prepare the material, so that a laser dye concentration of at least $10^{-4}$ mol/l can be obtained when the microparticles containing the laser dye are placed in the aqueous medium. Adequate solubility in this context means, that at least 90% light absorption of the excitation light is achieved in the laser active medium of the dye laser.

Microparticles with these properties can be made from a number of organic and inorganic compounds.

Good results are achieved with microparticles that are smaller than 500 $\mu$m, preferably smaller than 200 $\mu$m, and comprise transparent polymerized organic compounds or transparent polymerized inorganic compounds.

Especially suitable as materials for the microparticles are polysilanes, polymer esters of methacrylic acid and polymer esters of acrylic acid, the ester group consisting of linear and branched aliphatic hydrocarbon groups, as i.e. methyl, ethyl, isobutyl and butyl groups. Polycarbonates and polystyrene can also be used for the microparticles.

Acrylates and methacrylates fluorinated in the $\alpha$-position and/or in the ester group, following suspension or bead polymerization, are preferred for use as microparticles in the dye laser suspension. Some examples are methacrylic acid trifluoroethyl ester, methacrylic acid-2,2,3,4,4-hexafluorobutyl ester, methacrylic acid pentadecafluoroctyl ester and $\alpha$-fluoroacrylic acid-2,2,3,3,3-pentafluoropropyl ester.

In the present invention, laser dyes are brought into an aqueous suspendable form by placing or embedding the laser dyes in microparticles such that organic solvents are not needed. Thus, problems associated with the use of organic solvents in laser-active media are avoided.

Methods for manufacturing polymer microparticles are well known. See, for example, D. C. Blackely "Emulsion Polymerization", Applied Science, Publ. Ltd., London (1974); H. Logemann et al. in: Methods of Organic Chemistry, Houben-Weyl 14/1. Macromolecular Substances, Part 1, page 133, Thieme-Verlag (1961) 37; H. Hopff et al., *Macromol. Chemistry* 78, 24 (1964); H. Hopff and E. Lutz, *Kunststoffe-Plastics*, Vol. 5 (1958), page 341; W. S. Zimmt, *J. Appl. Sci.*, Vol. 1 (1959), page 323; and U.S. Pat. No. 2,701,245 (1955).

There are a number of techniques which can be used to form the laser-active dispersion of the present invention. In one embodiment of producing the laser-active dispersion, the laser dye is dissolved in a monomer (e.g. acrylate) which is dispersed in an aqueous phase with a protective colloid in microdrops, and then the monomer is polymerized to form microparticles containing the laser dye. Following the production of the microparticles, preferably in particle sizes below 200 $\mu$m, the particles are removed by means of filtration, washed and introduced into an aqueous liquid to form the laser active dispersion of the present invention. This dispersion can then be introduced into a laser dye cell (which is a flow through cell) of the dye laser. Thus, a transparent aqueous suspension of the microparticle embedded laser dye is produced. This aqueous suspension can be put directly into the dye laser for stimulated emission because no light is lost due to scattering in these systems.

Alternatively, the laser-active suspension can be prepared as follows. The suspension or emulsion polymerization is carried out without the laser dye, which would otherwise be dissolved in the monomer phase. Following polymerization of the emulsified monomers, the microparticles thus obtained are removed by filtration, washed and placed in water. The desired, water-insoluble laser dye is then added to the dispersion, and the dispersion is then boiled until the dye has completely dissolved into the polymer microparticles. Following isolation of the dye-containing microparticles and washing with alcohol to remove the non-absorbed dye, the particles are placed in a suitable aqueous liquid to form a suspension and the suspension is then placed into the dye laser.

In accordance with the present invention, the aqueous medium or liquid into which the microparticles is introduced should have an index of refraction which is substantially the same ($\pm 0.003$) as the refractive index of the microparticles. The aqueous liquid can be pure water. However, the refractive index of the transparent microparticles usually deviates from the refractive index of pure water such that pure water usually cannot be used as a suspension agent for the laser dye-containing microparticles. An immersion agent is then added to the water to adjust the refractive index of the resulting aqueous medium so that it is substantially the same or is equal to the refractive index of the microparticles. The immersion agent is selected based on the composition of the microparticles and their index of refraction. The concentration of the immersion agent is set such that at the operating temperature of the dye laser, the aqueous medium containing the immersing agent has the same or substantially the same index of refraction as that of the microparticles.

The immersion agent water solution must (1) transmit (>90%) light emitted by the pumping laser and the laser dye, (2) neither modify the microparticles or the embedded dye, and (3) match or substantially match the index of refraction of the microparticles at the operating temperature of the dye laser and at the emission wavelength of the dye laser. These three conditions are fulfilled by a number of immersion agent solutions.

The sulfates and chlorides of alkali and alkaline earth elements and the corresponding ammonia compounds are quite suitable as immersion agents in any concentration. Furthermore, aqueous solutions of organic water-soluble compounds, preferably in concentrations ranging from about 10 to 18% by weight, may be used including mono-ethylene glycol, glycerin and glucose.

The immersion agent solution can also be prepared by means of blending various immersion agents.

When the microparticles have the same or substantially the same index of refraction as water, an immersion agent is not needed. This applies in particular when the particle size of the microparticles is below 100 nm.

The following examples are given by way of illustration to further explain the principles of the invention. These examples are merely illustrative and are not to be understood as limiting the scope and underlying principles of the invention in any way. All percentages referred to herein are by weight unless otherwise indicated.

The invention is explained in detail with the aid of examples as follows:

EXAMPLE 1

Referring now to FIG. 1, there is shown an apparatus for making microparticles comprising a reactor 1 which is provided with a reflux condenser 2, a four-blade propeller agitator of high quality steel 3, a drop funnel 4, a thermometer 5, and a gas delivery tube 8. Reactor 1 is positioned in a water bath 7 which is provided with a heater 6 and a thermometer 5.

An aqueous 0.1% polyvinyl alcohol solution (Mowiol 40/88, Hoechst AG) is introduced into reactor 1 and gassed for about 30 minutes with nitrogen introduced through tube 8. Under vigorous stirring of the polyvinyl alcohol solution at 500 revolutions per minute, a monomer phase containing trifluoroethyl methacrylate with 0.2% dibenzoyl peroxide as initiator, based on the weight of monomer (100 g) and 33.6 mg of the laser dye 2,2'''-dimethyl-p-quaterphenyl, is added from drop funnel 4 all at one time. The resulting solution becomes immediately cloudy upon rapid heating to 70° C. After approximately 3 hours, the initial foam formation subsides and transparent micro beads begin to precipitate on the upper edge of the solution. After optical inspection of the bead quality under the microscope, the polymerization is terminated after four hours by diluting with water, when the gel phase has been overcome and solid micro beads precipitate. The transparent micro beads are isolated by means of filtration and washed with a copious amount of hot water to remove the excess initiator, protective colloid and unreacted monomer.

The isolated micro beads (75 g) containing $3 \cdot 10^{-4}$ Mol/l laser dye are then suspended in an aqueous 30-wt. % $CaCl_2$ ($n_D^{20}=1.4130$) immersion agent solution 10 ml to form the laser-active dispersion the particle size being 80–200 $\mu$m of the present invention, and the dispersion is then added to the laser dye cell of a dye laser (FL 2000, Lambda Physik). The refraction index for the microparticles was 1.4730. The dye laser is pumped with a laser beam from an excimer laser (EMG 102, Lambda Physik Corporation) having a wavelength of 308 nm. The excimer laser is part of a transversal pump system. The dye laser and transversal pump system are known in the art.

The wavelength of the dye laser is tuned via a reflection grating. The dye laser beam from the laser dye cell is widened by a first lens system before the dye laser beam strikes the reflection grating. The dye laser beam is sent through a second lens system which serves as an output coupling mirror behind the laser dye cell. The laser dye absorption at the pumping wavelength of the excimer laser of 308 nm is adjusted such that 99% of the excitation light is absorbed in the laser dye cell with an absorption path length of 0.15 cm in the laser dye cell. A pulse energy from the excimer laser of approximately 20 mJ per pulse with an energy density of 0.4 mJ/cm² at a pulse frequency of 1 Hz is focused into the suspension of microbeads. The emitted energy of the dye laser is measured with a joule meter (pyroelectric detector). By rotating the reflection grating in small angles, the entire spectral range in which the suspension of micro beads embedded with 2,2'''-dimethyl-p-quaterphenyl shows laser emission is scanned at several measuring points. A maximum dye laser emission of 0.9 mJ is measured at 366 nm. The tuning range of the dye laser is between 358 and 378 nm.

EXAMPLE 2

The procedure according to Example 1 is repeated, except that micro beads are prepared with the laser dye POPOP (2,2'-p-phenylene bis(5-phenyloxazol) in polytrifluoroethyl methacrylate ($10^{-4}$ Mol/l, 75 g). 85% of the particles have a size in the range from 100 to 200 $\mu$m. The micro beads are then suspended in 10 ml of a clear aqueous solution of a 30 wt % MgCl solution ($n_D^{20}=1.4150$) to form the laser-active dispersion of the present invention. When placed in a laser dye cell of a dye laser and tested as in Example 1, with the exception that the 351 nm excitation wavelength was used a maximum dye laser emission was measured at 413 nm. The tuning range of the dye laser was 406 to 447 nm.

EXAMPLE 3

The process of Example 1 was repeated, except that micro beads are prepared with $2 \times 10^{-3}$M of the laser dye coumarin 47 (7-diethyamino-4-methyl coumarin) in poly-2,2,3,4,4,4-hexafluorobutyl methacrylate. The microbeads (70 g, 100–200 $\mu$m) were suspended in a 41% aqueous sugar solution ($n_D^{20}=1.4005$) and the light absorption of the clear transparent bead suspension was adjusted to 99% in the laser dye cell. Optical excitation with a XeF excimer laser at a pumping wavelength of 351 nm yielded a maximum dye laser emission at 447 nm and a tuning range of 430 to 472 nm.

EXAMPLE 4

The process employed in Example 1 was repeated, except that microparticles (80–150 $\mu$m) were prepared from poly-2,2,3,3,3-pentafluoropropyl-$\alpha$- fluoroacrylate by bead polymerization without the use of a laser dye. The colorless, clear beads were siphoned off, and washed with a copious amount of hot water. Approximately 100 g of the micro beads then were heated in distilled water with 350 mg of the laser dye coumarin 6 (3-(2'-benzothiazoyl)-7-diethylamino- courmarin) in an ultra sonic bath until the micro beads reach a uniform deep yellow color. The now yellow micro beads are siphoned off and washed with methanol to remove remaining laser dye crystals which did not dissolve into the micro beads. The micro beads are then suspended in an 4% aqueous solution of LiCl ($n_D^{20}=1.3510$) to prepare a clear, aqueous suspension. The light absorption of the clear suspension was adjusted to 99% in the laser dye cell. Optical excitation with an XeF excimer laser at a pumping wavelength of 351 nm yielded a maximum dye laser emission at 526 nm and a tuning ranging of 511 to 548 nm.

It will be understood that the above description of the present invention is susceptible to various modifications, changes and adaptations, and the same are intended to be comprehended within the meaning and range of equivalents of the appended claims.

What is claimed is:

1. A laser-active dispersion of a laser dye which can be excited to laser emission by a pumping laser, comprising: microparticles containing a laser dye, an aqueous liquid having a refractive index substantially the same as that of the microparticles, and wherein the microparticles are suspended in the aqueous liquid.

2. A laser-active dispersion according to claim 1, wherein said microparticles comprise a transparent polymerized organic or inorganic compound.

3. A laser-active dispersion according to claim 2, wherein said microparticles comprise a polymethacrylate, a polyacrylate, a polysilane, a polycarbonate or a polystyrene.

4. A laser-active dispersion according to claim 2, wherein said microparticles comprise a polyacrylate or polymethacrylate fluorinated in the α-position, in the ester group or in both the α-position and the ester group.

5. A laser-active dispersion according to claim 1, wherein the aqueous liquid is pure water.

6. A laser-active dispersion according to claim 1, wherein the aqueous liquid comprises an immersion agent dissolved in water.

7. A laser-active dispersion according to claim 6, wherein the aqueous liquid containing the immersion agent water solution does not substantially absorb any light in the wavelength range of a pumping laser used to excite the laser dye or in the wavelength range of the laser beam emitted by the laser dye.

8. A laser-active dispersion according to claim 6, wherein the concentration of the immersion agent is adjusted so that the aqueous liquid has substantially the same index of refraction as the microparticles.

9. A laser-active dispersion according to claim 6, wherein the immersion agent is an inorganic salt.

10. A laser-active dispersion according to claim 6, wherein the immersion agent is ammonium chloride or ammonium sulfate.

11. A laser-active dispersion according to claim 6, wherein the immersion agent is at least one salt selected from the sulfate or chloride salts of the alkali metal or alkaline earth metal elements.

12. A laser-active dispersion according to claim 6, wherein the immersion agent comprises a water-soluble organic substance.

13. A laser-active dispersion according to claim 12, wherein said water-soluble organic substance is monoethylene glycol, glycerin, glucose or a mixture thereof.

14. A method for producing laser light, which comprises exciting a laser-active aqueous dispersion of a laser dye by means of a pumping laser wherein said dispersion comprises microparticles containing a laser dye, and wherein said microparticles are suspended in an aqueous liquid having a refractive index substantially the same as that of said microparticles.

15. A method for producing laser light as recited in claim 14, wherein said microparticles comprise a transparent polymerized organic or inorganic compound.

16. A method for producing laser light as recited in claim 14, wherein said aqueous liquid comprises an immersion agent dissolved in water.

17. A laser-active dispersion according to claim 8, wherein the aqueous liquid has an index of refraction which is ±0.003 with respect to the index of refraction of the microparticles.

18. A laser-active dispersion according to claim 1, wherein the aqueous liquid has the same index of refraction as that of the microparticles.

19. A laser-active dispersion according to claim 1, wherein the aqueous liquid has an index of refraction which is ±0.003 with respect to the index of refraction of the microparticles.

* * * * *

UNITED STATES PATENT AND TRADEMARK OFFICE
CERTIFICATE OF CORRECTION

PATENT NO. : 4,853,937

DATED : August 1, 1989

INVENTOR(S) : Rinke et al.

It is certified that error appears in the above-identified patent and that said Letters Patent is hereby corrected as shown below:

Title page:
Line [75], change "Spever" to --Speyer--.
Column 3, line 17, change "7.49" to --1.49--.
Column 5, line 50, change "1.4730" to --1.4130--.

Signed and Sealed this

Twenty-seventh Day of November, 1990

Attest:

HARRY F. MANBECK, JR.

*Attesting Officer*    *Commissioner of Patents and Trademarks*